US008412630B2

(12) United States Patent
Ross et al.

(10) Patent No.: US 8,412,630 B2
(45) Date of Patent: Apr. 2, 2013

(54) SOCIAL NETWORK PAYMENT SETTLEMENT SYSTEM

(75) Inventors: Erik Stephen Ross, Charlotte, NC (US); Carrie Anne Hanson, Charlotte, NC (US); Susan Smith Thomas, Gastonia, NC (US)

(73) Assignee: Bank of America Corporation, Charlotte, NC (US)

( * ) Notice: Subject to any disclaimer, the term of this patent is extended or adjusted under 35 U.S.C. 154(b) by 118 days.

(21) Appl. No.: 13/087,909

(22) Filed: Apr. 15, 2011

(65) Prior Publication Data
US 2012/0265678 A1  Oct. 18, 2012

(51) Int. Cl.
*G06Q 40/00* (2012.01)
(52) U.S. Cl. .......... 705/42; 705/2; 705/14.1; 705/26.35; 705/39; 705/40; 705/44; 705/78; 705/218; 705/329
(58) Field of Classification Search .......... None
See application file for complete search history.

(56) References Cited

U.S. PATENT DOCUMENTS

| | | | |
|---|---|---|---|
| 5,790,677 A * | 8/1998 | Fox et al. ............... | 705/78 |
| 7,188,153 B2 * | 3/2007 | Lunt et al. ............. | 709/218 |
| 7,376,587 B1 * | 5/2008 | Neofytides et al. ...... | 705/26.35 |
| 7,941,371 B1 * | 5/2011 | Guinan et al. .......... | 705/39 |
| 2006/0085259 A1 * | 4/2006 | Nicholas et al. ....... | 705/14 |
| 2007/0271179 A1 * | 11/2007 | Kubota ................ | 705/39 |
| 2008/0077528 A1 * | 3/2008 | Neff .................. | 705/44 |
| 2008/0288277 A1 * | 11/2008 | Fasciano ............. | 705/1 |
| 2009/0012895 A1 * | 1/2009 | Mehrabi .............. | 705/39 |
| 2009/0119212 A1 * | 5/2009 | Liu et al. ............ | 705/44 |
| 2009/0182664 A1 * | 7/2009 | Trombley ............. | 705/42 |
| 2010/0312696 A1 * | 12/2010 | Sinha et al. ......... | 705/40 |
| 2011/0166872 A1 * | 7/2011 | Cervenka et al. ...... | 705/2 |
| 2012/0047065 A1 * | 2/2012 | Neff ................ | 705/40 |

FOREIGN PATENT DOCUMENTS
WO        WO 01/04816   *  1/2001

OTHER PUBLICATIONS

Andrés Guadamuz González. "PayPal: the legal status of C2C payment systems." Computer Law & Security Review. vol. 20, Issue 4, Jul.-Aug. 2004, pp. 293-299.*

* cited by examiner

*Primary Examiner* — Robert Niquette
(74) *Attorney, Agent, or Firm* — Michael A. Springs; Moore & Van Allen PLLC; Patrick B. Horne

(57) ABSTRACT

A method for effecting transfer of a payment amount to a merchant during a transaction between a customer and the merchant includes determining, using a processing device, a funds shortfall, accessing a funds sharing network comprising a plurality of users, identifying one or more of the users of the funds sharing network, requesting funds from the identified one or more users, and applying funds received from the one or more users to the funds shortfall. In some embodiments, identifying one or more of the users includes determining whether one or more of the users are indebted to the customer, determining levels of connection between two or more of the users and the customer, and developing a hierarchy of users based on the indebted users and the levels of connection.

53 Claims, 9 Drawing Sheets

SOCIAL NETWORK PAYMENT SETTLEMENT SYSTEM

FIELD

In general, embodiments of the invention relate to systems for effecting payment for a transaction between a customer and a merchant. More specifically, embodiments of the invention relate to systems for accessing a funds sharing network and identifying one or more users for sharing funds to effect payment for the transaction.

BACKGROUND

In recent history, social networks provide users access to information, services, and contact opportunities unthinkable only a few short years ago. Social networks connect people already acquainted as well as those people having similar interest and/or backgrounds. Other types of networks, that is, networks not necessarily structured for informal social interaction provide additional functionality for users interested in client development, business networking and the like.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

According to embodiments of the invention, a method for effecting transfer of a payment amount to a merchant during a transaction between a customer and the merchant includes determining, using a processing device, a funds shortfall, accessing a funds sharing network comprising a plurality of users, identifying one or more of the users of the funds sharing network, requesting funds from the identified one or more users, and applying funds received from the one or more users to the funds shortfall.

In some embodiments, determining a funds shortfall comprises determining a difference between funds available to the customer and the payment amount such that the customer is incapable to complete the transaction. In some embodiments, determining a funds shortfall comprises determining a total credit maximum associated with the customer, determining an available positive balance, determining an available funds amount based at least in part on the total credit maximum and the available positive balance, and determining the funds shortfall by comparing the payment amount with the available funds amount. In some embodiments, accessing a funds sharing network comprising a plurality of users comprises accessing a social network of the customer.

In some embodiments, identifying one or more of the users of the funds sharing network comprises determining whether one or more of the users of the funds sharing network are indebted to the customer. In some such embodiments, identifying one or more of the users of the funds sharing network comprises determining that two or more of the users of the funds sharing network are indebted to the customer, comparing the indebtedness of the two or more users to develop a hierarchy of indebtedness, and choosing one or more of the two or more users based at least in part on the hierarchy of indebtedness.

In some embodiments, identifying one or more of the users of the funds sharing network comprises determining levels of connection between two or more of the users and the customer, comparing the levels of connection in order to develop a hierarchy of connection, and choosing one or more of the two or more users based at least in part on the hierarchy of connection. In some embodiments, accessing a funds sharing network comprising a plurality of users comprises accessing a network of users socially unassociated with the user, the network of users associated with the user solely for purposes of sharing funds. In some embodiments, requesting funds from the identified one or more users comprises sending a communication to the one or more users requesting some or all the funds shortfall. In some embodiments, requesting funds from the identified one or more users comprises accessing an account owned by one of the identified users and wherein applying funds received from the one or more users to the funds shortfall comprises transferring some or all the funds shortfall from the accessed account to the merchant. In some embodiments, requesting funds from the identified one or more users comprises accessing an account owned by one of the identified users and wherein applying funds received from the one or more users to the funds shortfall comprises transferring an amount equal to some or all the funds shortfall from the accessed account to the customer and transferring an amount equal to some or all the funds transferred from the one or more users to the customer to the merchant.

In some embodiments, the method also includes collecting a transaction fee from the customer for managing completion of the transaction. In some such embodiments, collecting the transaction assessment comprises transferring additional funds from one or more of the users of the funds sharing network and applying the additional funds to the transaction assessment.

In some embodiments, the method also includes collecting a participation assessment from the customer and each of the users of the funds sharing network for access to the funds sharing network and for potentially managing completion of one or more transactions having funds shortfalls. In some embodiments, the method also includes receiving a participation amount from the customer and each of the users of the funds sharing network as contributions to one or more funds sharing accounts.

In some embodiments, the one or more users identified from the funds sharing network are not indebted to the customer, and the method also includes tracking a customer indebtedness of the customer to the one or more identified users based at least in part on the amount of funds received from the one or more users and applied to the funds shortfall. In some such embodiments, the method also includes communicating a message to the customer, the message comprising a reminder of the customer indebtedness to the one or more identified users. In other such embodiments, the method also includes applying an interest amount to the customer indebtedness based on a period of elapsed time of the customer indebtedness. In yet other such embodiments, the method also includes communicating one or more messages to at least one of the users of the funds sharing network, the one or more messages comprising information related to the customer indebtedness, thereby motivating the customer to repay the customer indebtedness.

According to other embodiments of the invention, a system for effecting transfer of a payment amount to a merchant during a transaction between a customer and the merchant has a processing device configured for determining a funds shortfall, accessing a funds sharing network comprising a plurality of users, identifying one or more of the users of the funds sharing network, requesting funds from the identified one or more users, and applying funds received from the one or more users to the funds shortfall.

In some embodiments, determining a funds shortfall comprises determining a difference between funds available to the customer and the payment amount such that the customer is incapable to complete the transaction. In some embodiments, determining a funds shortfall comprises determining a total credit maximum associated with the customer, determining an available positive balance, determining an available funds amount based at least in part on the total credit maximum and the available positive balance, and determining the funds shortfall by comparing the payment amount with the available funds amount. In some embodiments, accessing a funds sharing network comprising a plurality of users comprises accessing a social network of the customer.

In some embodiments, identifying one or more of the users of the funds sharing network comprises determining whether one or more of the users of the funds sharing network are indebted to the customer. In some such embodiments, identifying one or more of the users of the funds sharing network comprises determining that two or more of the users of the funds sharing network are indebted to the customer, comparing the indebtedness of the two or more users to develop a hierarchy of indebtedness, and choosing one or more of the two or more users based at least in part on the hierarchy of indebtedness.

In some embodiments, identifying one or more of the users of the funds sharing network comprises determining levels of connection between two or more of the users and the customer, comparing the levels of connection in order to develop a hierarchy of connection, and choosing one or more of the two or more users based at least in part on the hierarchy of connection. In some embodiments, accessing a funds sharing network comprising a plurality of users comprises accessing a network of users socially unassociated with the user, the network of users associated with the user solely for purposes of sharing funds. In some embodiments, requesting funds from the identified one or more users comprises sending a communication to the one or more users requesting some or all the funds shortfall. In some embodiments, requesting funds from the identified one or more users comprises accessing an account owned by one of the identified users and wherein applying funds received from the one or more users to the funds shortfall comprises transferring some or all the funds shortfall from the accessed account to the merchant. In some embodiments, requesting funds from the identified one or more users comprises accessing an account owned by one of the identified users and wherein applying funds received from the one or more users to the funds shortfall comprises transferring an amount equal to some or all the funds shortfall from the accessed account to the customer and transferring an amount equal to some or all the funds transferred from the one or more users to the customer to the merchant.

In some embodiments, the processing device is further configured for collecting a transaction fee from the customer for managing completion of the transaction. In some such embodiments, collecting the transaction assessment comprises transferring additional funds from one or more of the users of the funds sharing network and applying the additional funds to the transaction assessment.

In some embodiments, the processing device is further configured for collecting a participation assessment from the customer and each of the users of the funds sharing network for access to the funds sharing network and for potentially managing completion of one or more transactions having funds shortfalls. In some embodiments, the processing device is further configured for receiving a participation amount from the customer and each of the users of the funds sharing network as contributions to one or more funds sharing accounts.

In some embodiments, the one or more users identified from the funds sharing network are not indebted to the customer, and the processing device is further configured for tracking a customer indebtedness of the customer to the one or more identified users based at least in part on the amount of funds received from the one or more users and applied to the funds shortfall. In some such embodiments, the processing device is further configured for communicating a message to the customer, the message comprising a reminder of the customer indebtedness to the one or more identified users. In other such embodiments, the processing device is further configured for applying an interest amount to the customer indebtedness based on a period of elapsed time of the customer indebtedness. In yet other such embodiments, the processing device is further configured for communicating one or more messages to at least one of the users of the funds sharing network, the one or more messages comprising information related to the customer indebtedness, thereby motivating the customer to repay the customer indebtedness.

According to embodiments of the invention, a computer program product has a non-transient computer-readable medium with computer-executable instructions for effecting transfer of a payment amount to a merchant during a transaction between a customer and the merchant. The instructions include instructions for determining a funds shortfall, instructions for accessing a funds sharing network comprising a plurality of users, instructions for identifying one or more of the users of the funds sharing network, instructions for requesting funds from the identified one or more users, and instructions for applying funds received from the one or more users to the funds shortfall.

In some embodiments, the instructions for determining a funds shortfall comprise instructions for determining a difference between funds available to the customer and the payment amount such that the customer is incapable to complete the transaction. In some embodiments, the instructions for determining a funds shortfall comprise instructions for determining a total credit maximum associated with the customer, instructions for determining an available positive balance, instructions for determining an available funds amount based at least in part on the total credit maximum and the available positive balance, and instructions for determining the funds shortfall by comparing the payment amount with the available funds amount. In some embodiments, the instructions for accessing a funds sharing network comprising a plurality of users comprise instructions for accessing a social network of the customer.

In some embodiments, the instructions for identifying one or more of the users of the funds sharing network comprise instructions for determining whether one or more of the users of the funds sharing network are indebted to the customer. In some such embodiments, the instructions for identifying one or more of the users of the funds sharing network comprise instructions for determining that two or more of the users of the funds sharing network are indebted to the customer, instructions for comparing the indebtedness of the two or more users to develop a hierarchy of indebtedness, and instructions for choosing one or more of the two or more users based at least in part on the hierarchy of indebtedness.

In some embodiments, the instructions for identifying one or more of the users of the funds sharing network comprise instructions for determining levels of connection between two or more of the users and the customer, instructions for comparing the levels of connection in order to develop a hierarchy of connection, and instructions for choosing one or more of the two or more users based at least in part on the hierarchy of connection. In some embodiments, the instructions for accessing a funds sharing network comprising a plurality of users comprise instructions for accessing a network of users socially unassociated with the user, the network of users associated with the user solely for purposes of sharing funds.

In some embodiments, the instructions for requesting funds from the identified one or more users comprise instructions for sending a communication to the one or more users requesting some or all the funds shortfall. In some embodiments, the instructions for requesting funds from the identified one or more users comprise instructions for accessing an account owned by one of the identified users and wherein the instructions for applying funds received from the one or more users to the funds shortfall comprise instructions for transferring some or all the funds shortfall from the accessed account to the merchant. In some embodiments, the instructions for requesting funds from the identified one or more users comprise instructions for accessing an account owned by one of the identified users and wherein the instructions for applying funds received from the one or more users to the funds shortfall comprise instructions for transferring an amount equal to some or all the funds shortfall from the accessed account to the customer and transferring an amount equal to some or all the funds transferred from the one or more users to the customer to the merchant.

In some embodiments, the instructions further comprise instructions for collecting a transaction fee from the customer for managing completion of the transaction. In some such embodiments, the instructions for collecting the transaction assessment comprise instructions for transferring additional funds from one or more of the users of the funds sharing network and instructions for applying the additional funds to the transaction assessment.

In some embodiments, the instructions further comprise instructions for collecting a participation assessment from the customer and each of the users of the funds sharing network for access to the funds sharing network and for potentially managing completion of one or more transactions having funds shortfalls. In some embodiments, the instructions further comprise instructions for receiving a participation amount from the customer and each of the users of the funds sharing network as contributions to one or more funds sharing accounts.

In some embodiments, the one or more users identified from the funds sharing network are not indebted to the customer, and wherein the instructions further comprise instructions for tracking a customer indebtedness of the customer to the one or more identified users based at least in part on the amount of funds received from the one or more users and applied to the funds shortfall. In some such embodiments, the instructions further comprise instructions for communicating a message to the customer, the message comprising a reminder of the customer indebtedness to the one or more identified users. In other such embodiments, the instructions further comprise instructions for applying an interest amount to the customer indebtedness based on a period of elapsed time of the customer indebtedness. In yet other such embodiments, the instructions further comprise instructions for communicating one or more messages to at least one of the users of the funds sharing network, the one or more messages comprising information related to the customer indebtedness, thereby motivating the customer to repay the customer indebtedness.

According to embodiments of the invention, a method for effecting transfer of a payment amount to a merchant during a transaction between a customer and the merchant includes determining, using a processing device, a difference between funds available to the customer and the payment amount such that the customer is incapable to complete the transaction, thereby resulting in a funds shortfall and accessing a funds sharing network comprising a plurality of users. The method also includes identifying one or more of the users of the funds sharing network, which includes determining whether one or more of the users of the funds sharing network are indebted to the customer, determining levels of connection between two or more of the users and the customer, and developing a hierarchy of users based at least in part on whether one or more of the users of the funds sharing network are indebted to the customer and based at least in part on the levels of connection between two or more of the users and the customer. The method also includes requesting funds from the identified one or more users and applying funds received from the one or more users to the funds shortfall.

In some embodiments, determining a funds shortfall comprises determining a total credit maximum associated with the customer, determining an available positive balance, determining an available funds amount based at least in part on the total credit maximum and the available positive balance, and determining the funds shortfall by comparing the payment amount with the available funds amount. In some embodiments, identifying one or more of the users of the funds sharing network further comprises determining that two or more of the users of the funds sharing network are indebted to the customer, comparing the indebtedness of the two or more users to develop a hierarchy of indebtedness, and choosing one or more of the two or more users based at least in part on the hierarchy of indebtedness. In some embodiments, identifying one or more of the users of the funds sharing network further comprises comparing the levels of connection in order to develop a hierarchy of connection and choosing one or more of the two or more users based at least in part on the hierarchy of connection. In some embodiments, identifying one or more of the users of the funds sharing network further comprises determining that none of the users of the funds sharing network are indebted to the customer, comparing the levels of connection in order to develop a hierarchy of connection, and choosing one or more of the two or more users based at least in part on the hierarchy of connection.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 1:
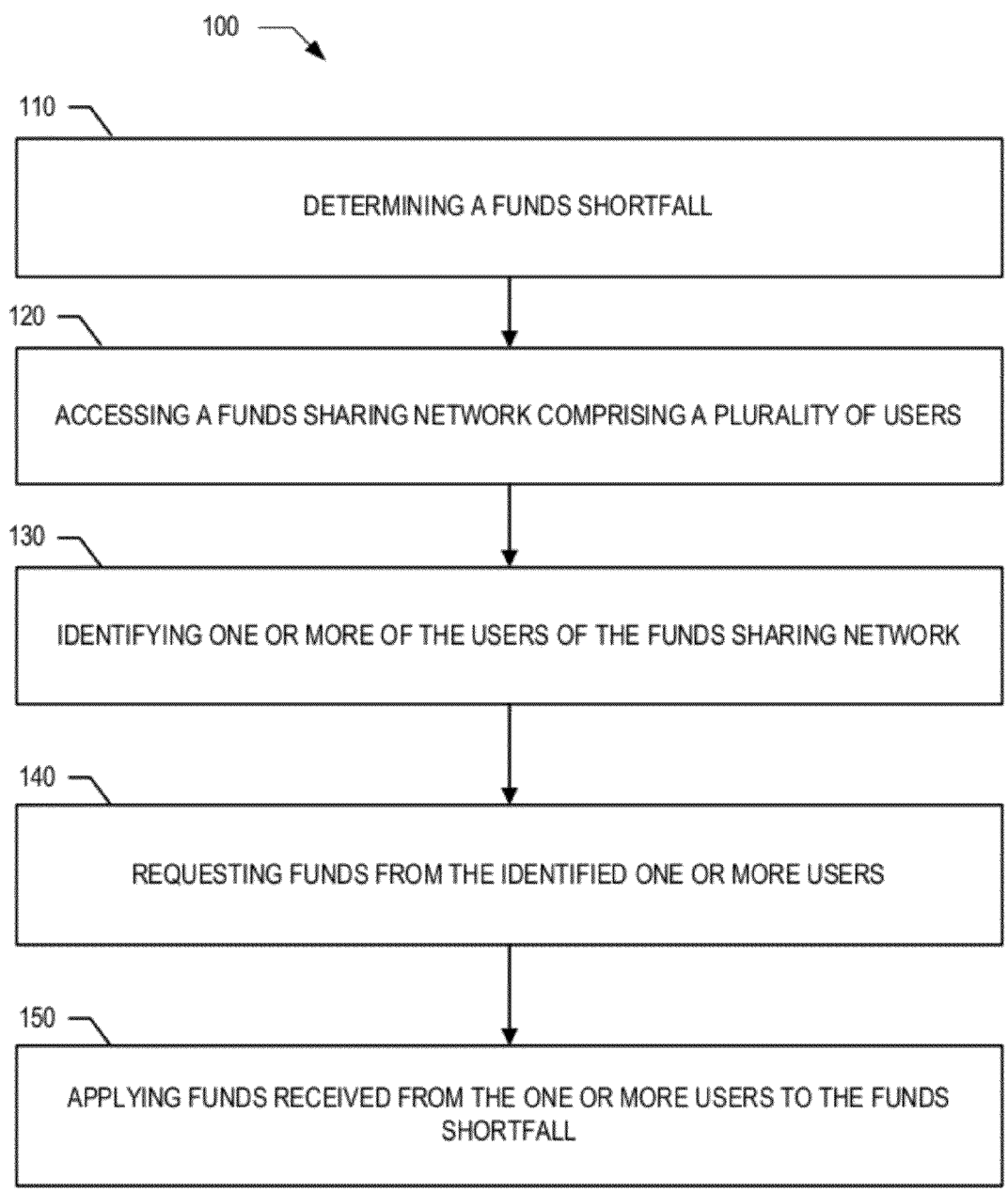
Figure 2:
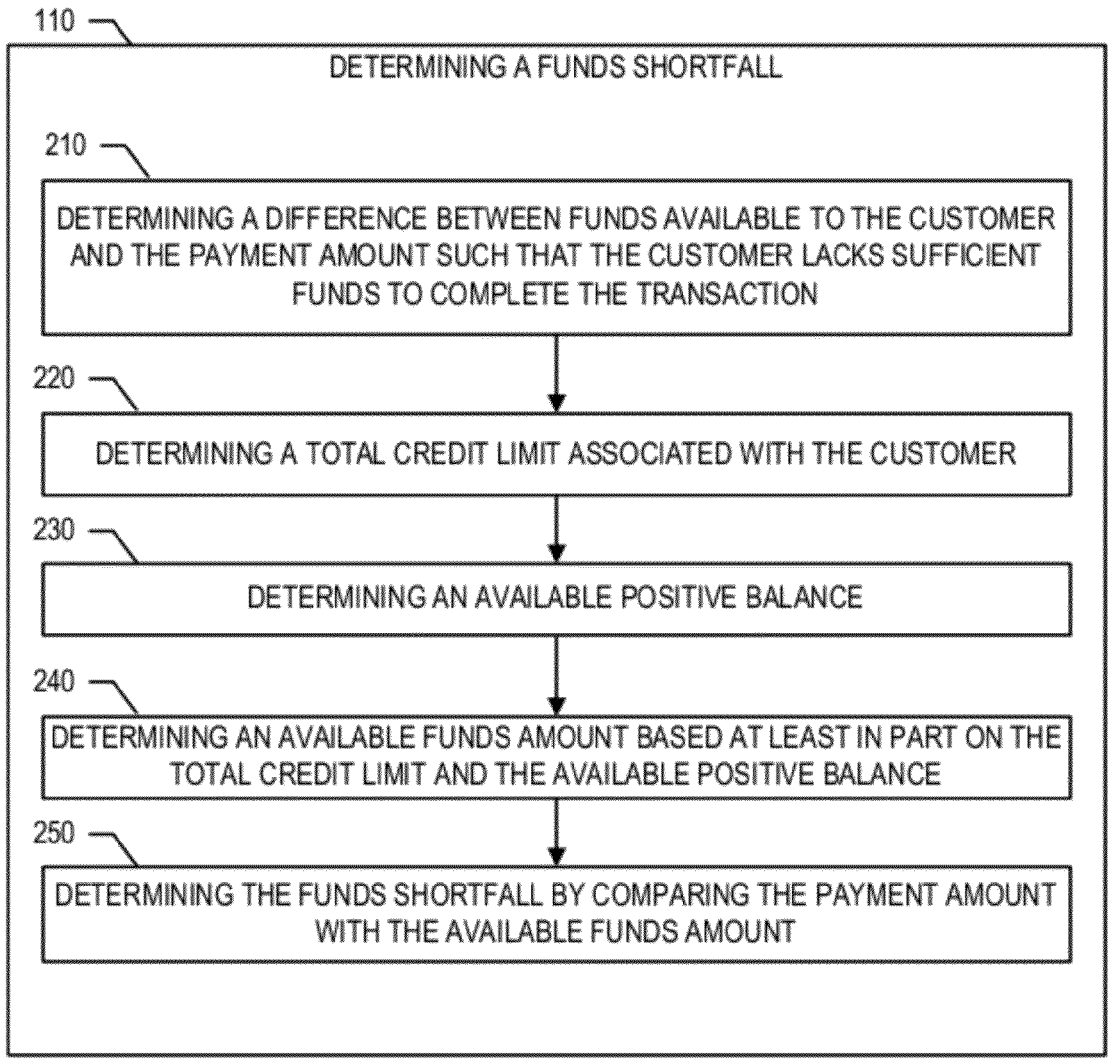
Figure 3:
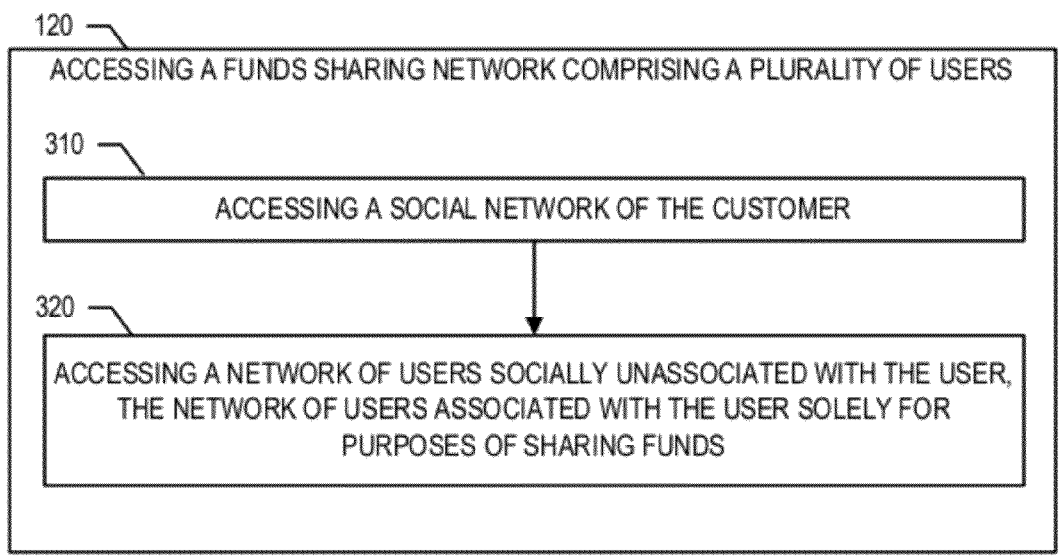
Figure 4:
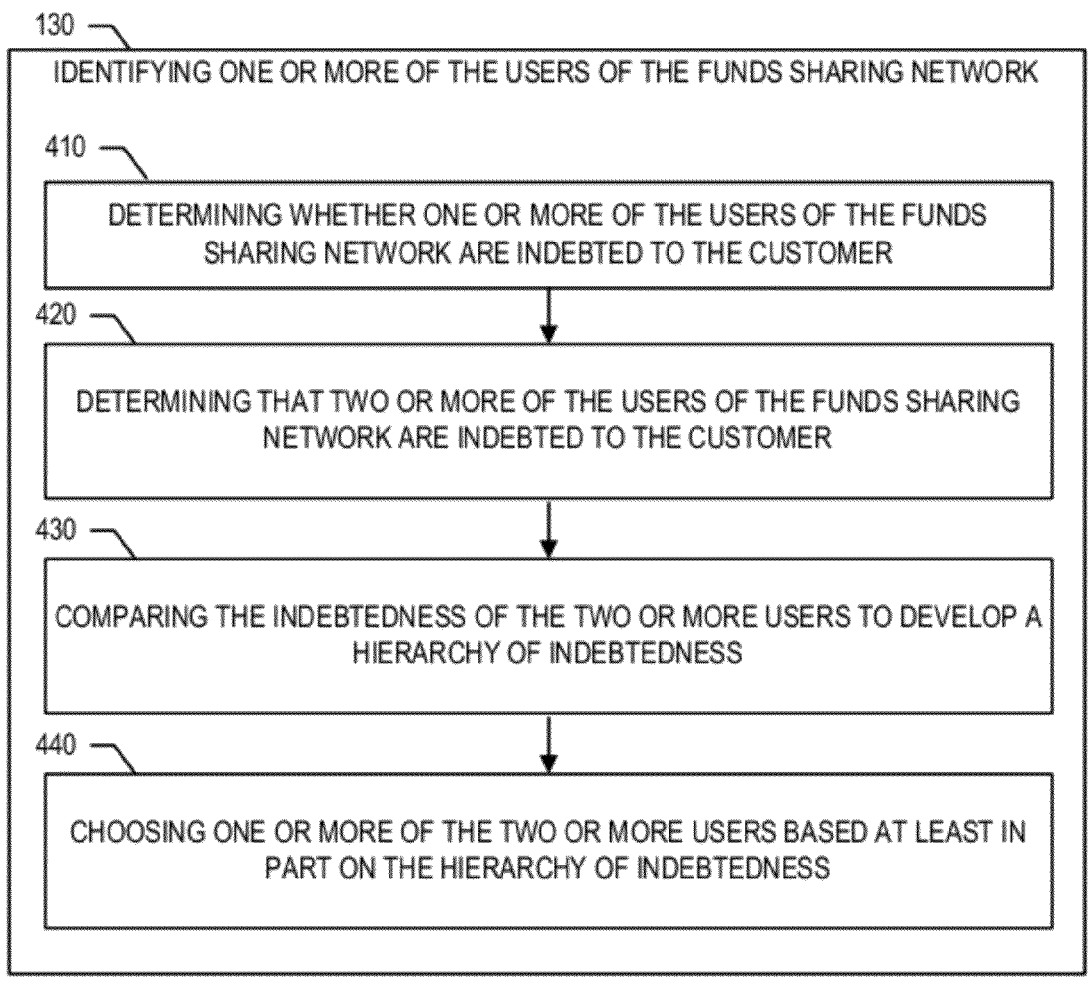
Figure 5:
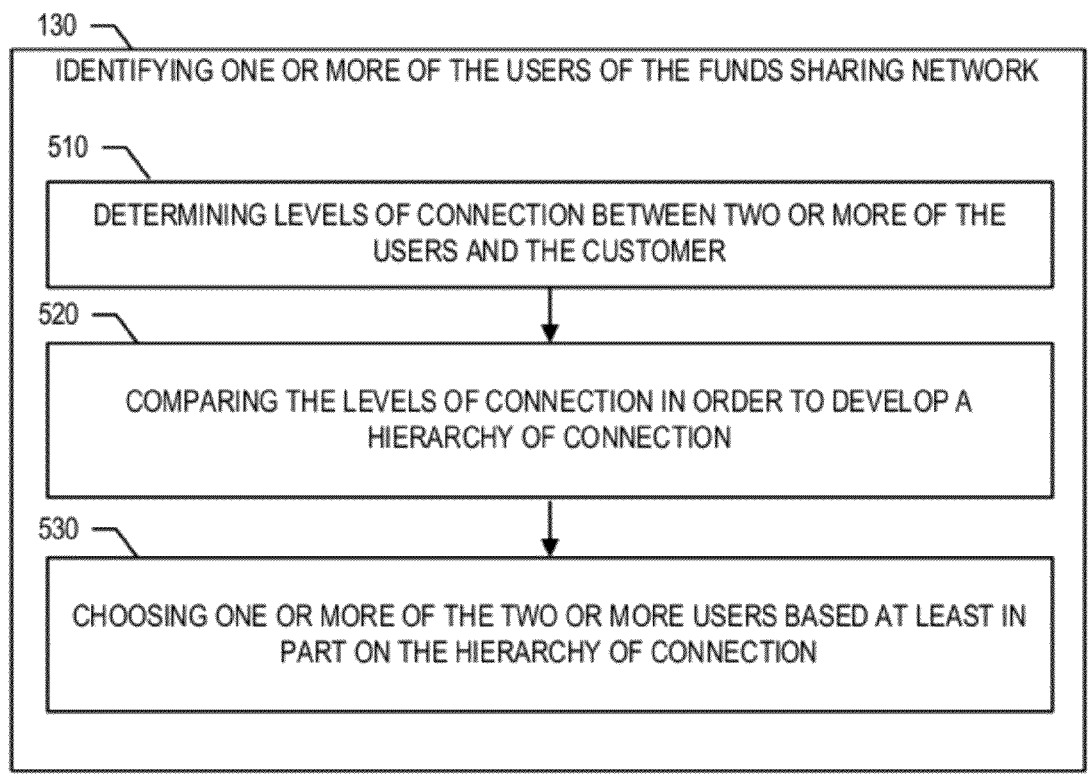
Figure 6:
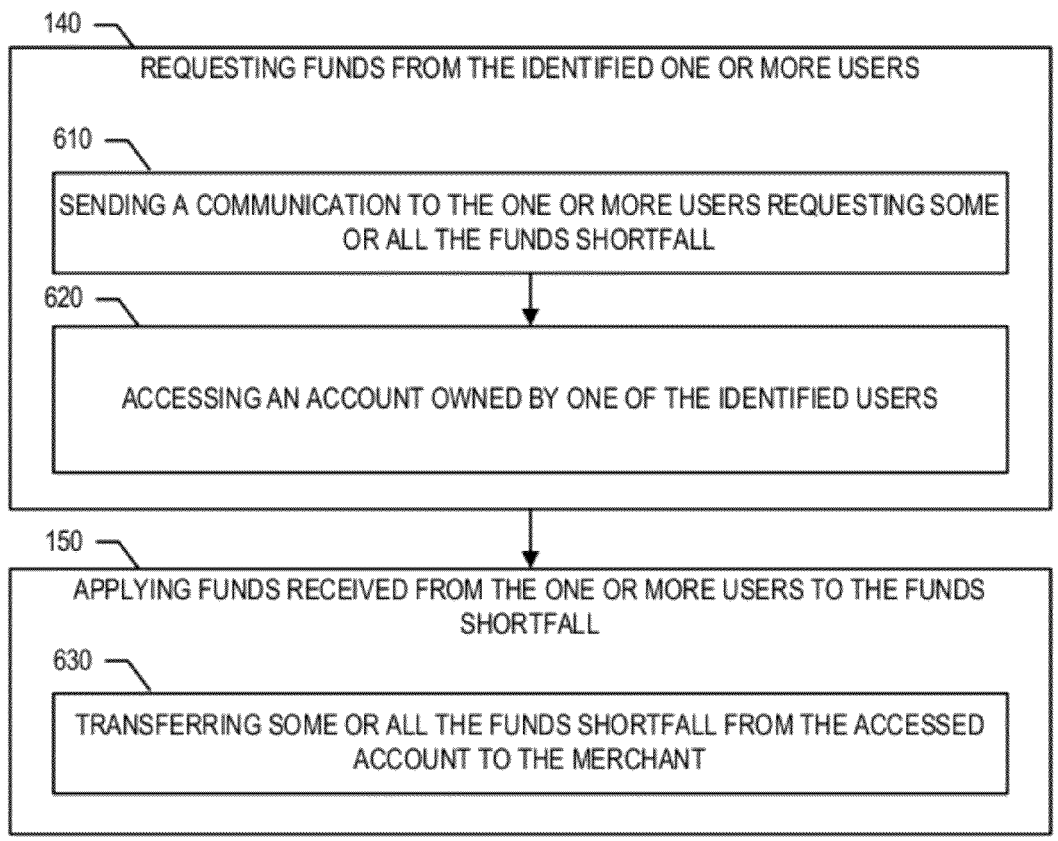
Figure 7:
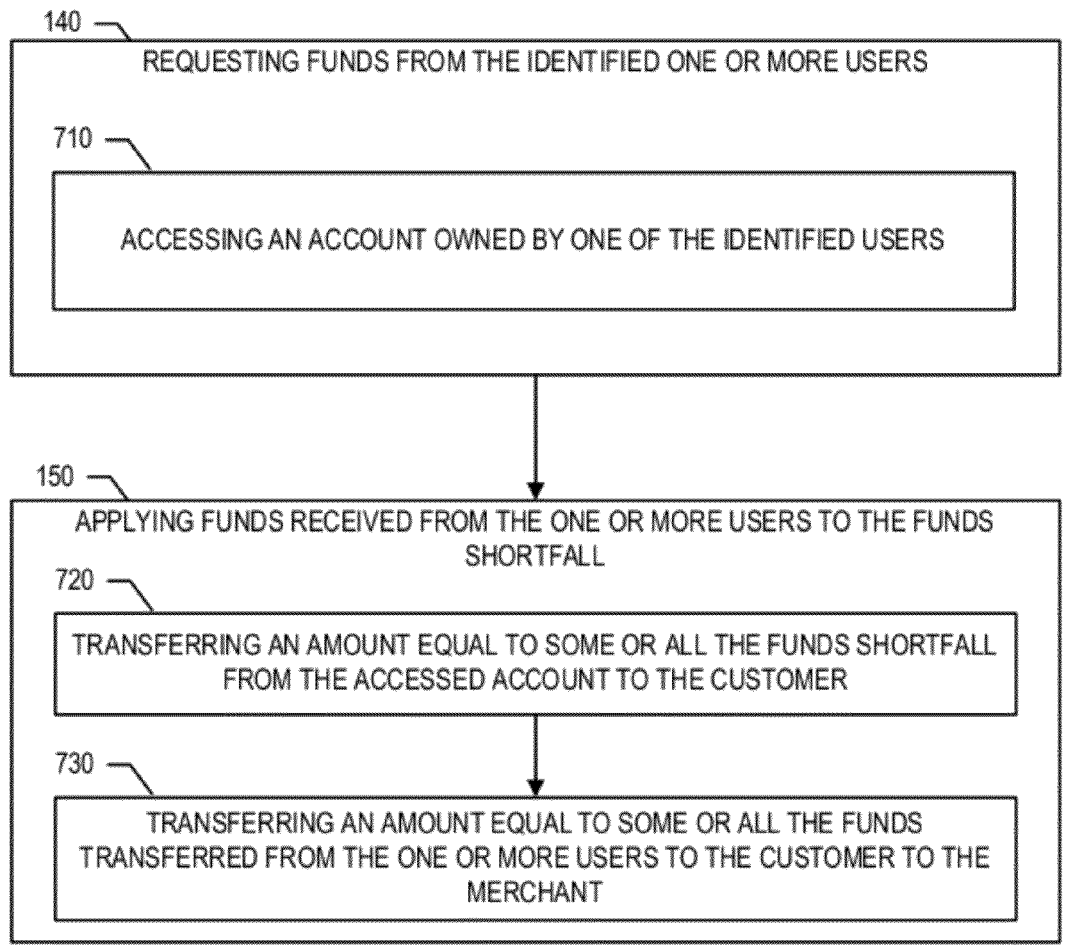
Figure 8:
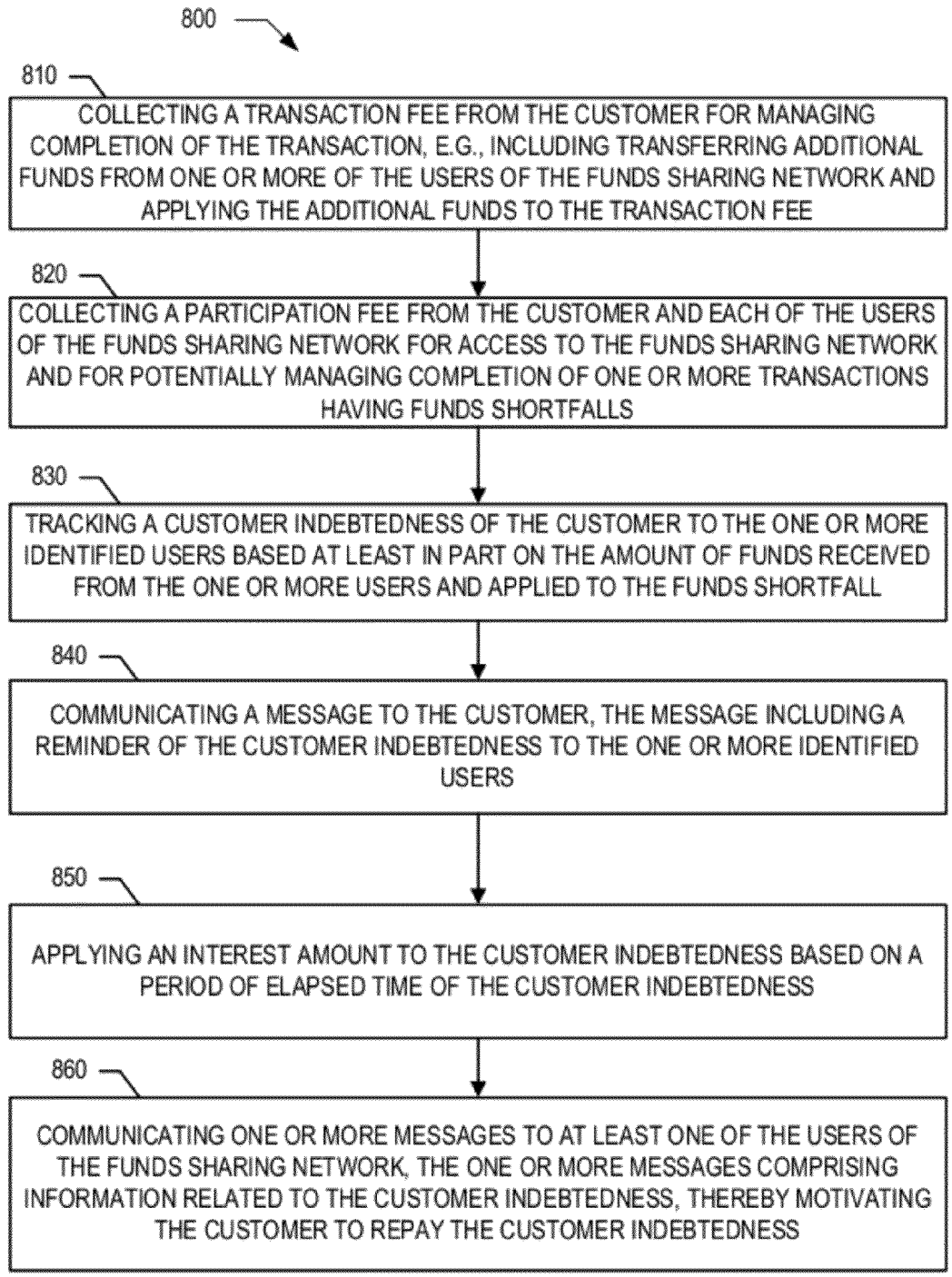
Figure 9:
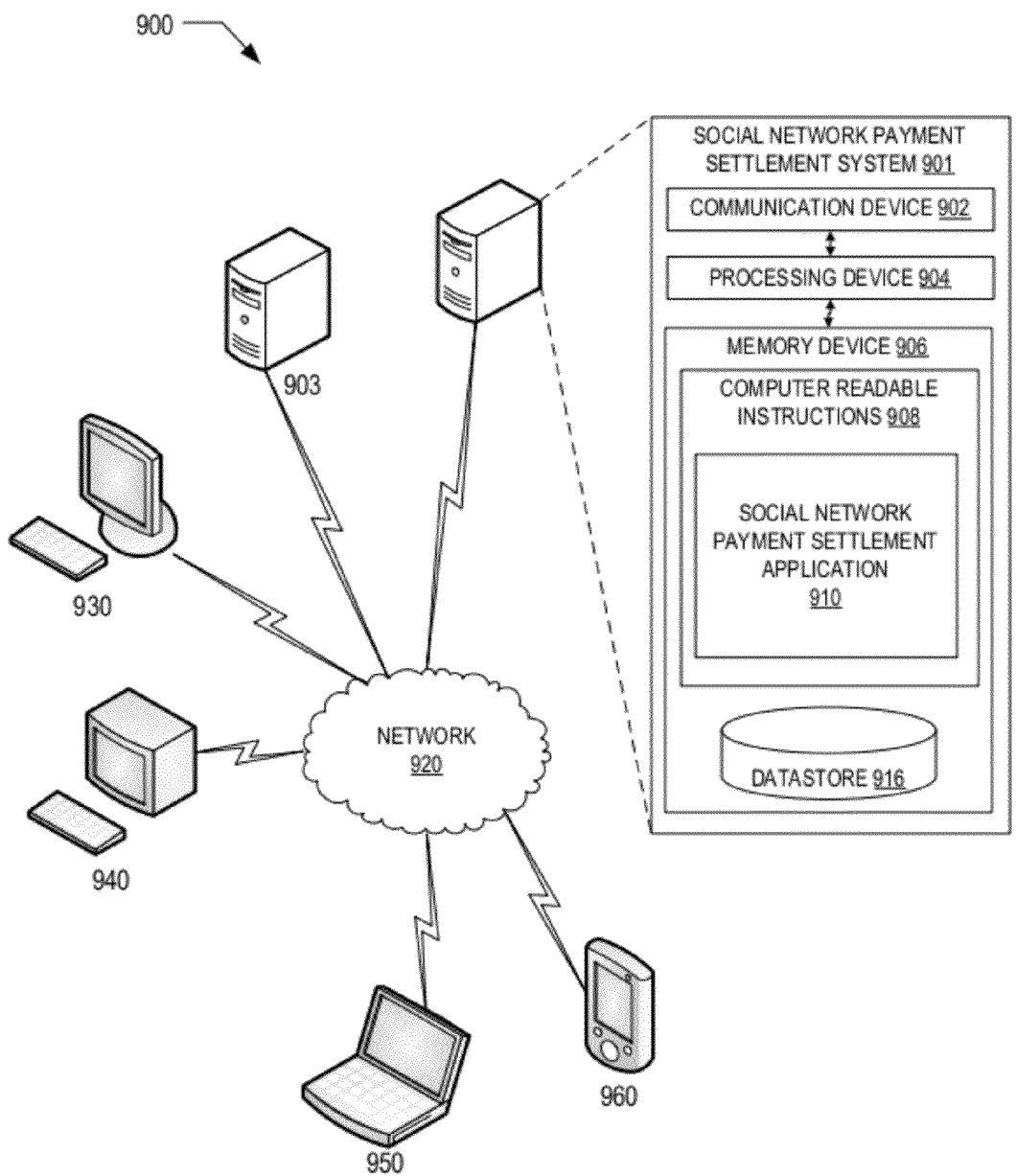

Having thus described embodiments of the invention in general terms, reference will now be made to the accompanying drawings, wherein:

FIG. 1 is a flowchart illustrating a method 100 for effecting transfer of a payment amount to a merchant during a transaction between a customer and the merchant according to embodiments of the invention;

FIG. 2 is a flowchart illustrating additional detail regarding step 110 originally presented in FIG. 1 according to embodiments of the invention;

FIG. 3 is a flowchart illustrating additional detail regarding step 120 originally presented in FIG. 1 according to embodiments of the invention;

FIG. 4 is a flowchart illustrating additional detail regarding step 130 originally presented in FIG. 1 according to embodiments of the invention;

FIG. 5 is a flowchart illustrating additional detail regarding step 130 originally presented in FIG. 1 according to embodiments of the invention;

FIG. 6 is a flowchart illustrating additional detail regarding steps 140 and 150 originally presented in FIG. 1 according to embodiments of the invention;

FIG. 7 is a flowchart illustrating additional detail regarding steps 140 and 150 originally presented in FIG. 1 according to embodiments of the invention;

FIG. 8 is a flowchart illustrating various steps that are performed in various embodiments of the method 100 according to embodiments of the invention; and FIG. 9 is a diagram illustrating an environment 900 in which a social network payment settlement system 901 may operate according to embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As discussed above, social networks and other networks available over the Internet provide users an unprecedented medium for interacting with one another, becoming re-acquainted with old friends, sharing information with those of similar interests or backgrounds, and in some instances, networks provide opportunities useful for business development. Embodiments of the invention leverage the functionality of current social networks and other networks in order to assist customers/users interested in sharing funds, such as during a transaction between a customer and a merchant.

In that regard, embodiments of the invention provide a method for effecting transfer of a payment amount to a merchant during a transaction between a customer and the merchant includes determining, using a processing device, a funds shortfall, accessing a funds sharing network comprising a plurality of users, identifying one or more of the users of the funds sharing network, requesting funds from the identified one or more users, and applying funds received from the one or more users to the funds shortfall. In some embodiments, identifying one or more of the users includes determining whether one or more of the users are indebted to the customer, determining levels of connection between two or more of the users and the customer, and developing a hierarchy of users based on the indebted users and the levels of connection.

Referring now to FIG. 1, a flowchart illustrates a method 100 for effecting transfer of a payment amount to a merchant during a transaction between a customer and the merchant according to embodiments of the invention. The first step, as represented by block 110, is determining a funds shortfall. Generally, a funds shortfall refers to an amount of funds necessary to purchase goods and/or services over and above an available amount. The available amount may be calculated in a variety of ways. The available amount, for example, may be based on one or more balances in one or more demand deposit accounts (DDAs), either individually or in combination. As another example, the available amount may be based on one or more balances in one or more credit accounts in relation to the one or more credit maximums associated with those accounts. As yet another example, the available amount may be based on a combination of one or more balances in one or more DDAs in combination with one or more balances in one or more credit accounts in relation to one or more credit maximum associated with those accounts. For example, in one embodiment, the available amount is calculated based on a combination of a balance in a checking account in combination with an available credit amount in a credit account. As a specific example, a customer may have $250.00 in a checking account and have a credit balance of $3000.00 in a credit account having a credit maximum of $5000.00. In such a case, in this embodiment, the available amount is calculated by summing the $250.00 with the difference between the credit maximum and the credit balance or $2000.00 for an available amount of $2250.00. In some embodiments, the customer is given an opportunity to establish preference by which the available amount is calculated. For instance, referring back to the example above, the customer may indicate as a preference that the available amount be calculated based on a preferred threshold credit amount. In other words, the customer may set a virtual credit maximum to be used in the calculation of the available amount. In this way, the customer may continue to maintain a lower credit balance than if the full and actual credit limit is used in the calculation.

For example, in a case where a customer has no available funds, the funds shortfall is the purchase price of the goods and/or services. As another example, in a case where a customer has a specific amount of funds available in one or more accounts, the funds shortfall is the purchase price of the goods and/or services minus the customer's available funds. As yet another example, in a case where a customer has a specific credit limit associated with an account and has a credit balance in that account, the system may be configured to calculate the funds shortfall based on the amount of credit available to the customer rather than the amount of funds available in a demand deposit account (DDA) such as a checking, savings, or other DDA.

The next step, as represented by block 120, is accessing a funds sharing network comprising a plurality of users. The funds sharing network, in various embodiments, includes users acquainted with the customer and/or users not acquainted with the customer. In some embodiments, the funds sharing network is maintained by a financial institution, such as the financial institution used by the customer for banking services. In other embodiments, the funds sharing network is a branch of a pre-existing social network.

The next step, as represented by block 130, is identifying one or more of the users of the funds sharing network. The system identifies the users from whom funds may be requested in subsequent steps using a variety of algorithms in various embodiments. For example, in some embodiments, the system determines a hierarchy of indebtedness among the users. The hierarchy of indebtedness indicates an amount of indebtedness to the customer. In some embodiments, within the hierarchy of indebtedness the system ranks the indebtedness of the several users with respect to the customer, and the system also determines which user or users are most indebted to the customer. In such embodiments, those users may be identified by the system and thereby targeted for requesting funds. As another example, in some embodiments, the system determines a hierarchy of connection between each user and the customer. The hierarchy of connection indicates the various levels of connection between each user and the customer. In some embodiments, within the hierarchy of connection, the system ranks the levels of connection for the various users, and the system also determines which user or users are most connected to the customer. In such embodiments, those users may be identified by the system and thereby targeted for requesting funds. In various other embodiments, the identification of users includes determining both a hierarchy of indebtedness as well as a hierarchy of connection and using both to determine from which, if any, users to request funds. In some embodiments, the system determines that no users are indebted to the customer and then determines a hierarchy of connection for use in identifying users from which to request funds.

The next step, as represented by block 140, is requesting funds from the identified one or more users. In some embodiments, the system is configured for creating and sending one or more messages to the identified users requesting funds for the purpose of providing the funds to the customer for completing the transaction. In some embodiments, the system is configured to simply initiate transfer of funds from an account owned by the one or more users identified in step 130. In various other embodiments, the system is configured for initiate transfer from another account, such as an account maintained by the financial institution implementing the social network settlement system and/or the funds sharing network. For example, in one embodiment, many users are part of the funds sharing network and pay a participation assessment for being part of the funds sharing network. Further, in some embodiments, irrespective of a possible participation assessment, the users of the funds sharing network pay a predetermined amount into a funds sharing account either regularly or on a periodic basis. The funds sharing account, in various embodiments, is configured to provide an account from which to draw funds in the event a user of the funds sharing network, such as the customer, requests funds to complete a transaction. In various embodiments, more than one funds sharing account is maintained by the financial institution implementing the program. In some of the embodiments discussed above, the system withdraws funds from one or more of the funds sharing accounts automatically and in others, a request is sent to an administrator, one or more of the users or another person with authority over the funds in the one or more accounts. In some embodiments, one or more funds sharing accounts are associated with one or more particular users and/or are associated with one or more specific types of purchases, such as one or more specific products and/or one or more specific merchants.

Once the funds have been requested as a result of the customer initiating a transaction and having a funds shortfall, the funds, as discussed above are generally transferred either to the merchant directly or to the customer. In such embodiments, the customer may then transfer the funds to the merchant. The final step, as represented by block 150, is applying funds received from the one or more users to the funds shortfall. In this regard, the customer may complete the transaction at a point of sale with a merchant regardless of the customer's funds shortfall.

In various embodiments, the funds shortfall is based on a request presented to one or more users by the customer. For example, the customer wants to make a purchase, such as a bicycle. The customer initiates, using the system of the invention or some other communication device, a request to the one or more users to borrow a certain amount for making the purchase. For example, the bicycle costs $50.00, and the customer inputs a request to the system for two of the users' friends to borrow $25.00 to fund the purchase of the bicycle. In this example, the system then communicates the request to the friends. In this regard, the identified users may be identified solely by the customer, or in some embodiments, the system may recommend one or more users to be chosen by the customer or the system may specify one or more users to be the identified users who will then receive requests for borrowing funds. In some embodiments, the system also receives customer input regarding a timeframe for borrowing the funds. In other embodiments, the system mandates, based on predetermined time limits, a timeframe for borrowing funds. In some embodiments instituting a timeframe for borrowing, the timeframe refers to the period of time for which the loan or borrowed funds will be borrowed. That is, the system may then automatically transfer funds from the customer to the users from which the funds were borrowed. In other embodiments, the timeframe refers to the period of time for which the borrowed funds accrue no interest, and at the end of which the borrowed funds will begin accruing interest. In various other embodiments, the timeframe is associated with other scenarios intended to motivate the customer-borrower to repay the funds to the user or users from which they were borrowed. Examples may include sending communications to the users, publishing information regarding the indebtedness to a social network, sending communications to the customer, turning the debt over to a third party, such as a collection agency, and the like.

Referring now to FIG. 2, a flowchart illustrates details regarding method step 110 originally presented in FIG. 1 according to embodiments of the invention. As discussed above, step 110 is determining a funds shortfall.

As represented by block 210, the first sub-step is determining a difference between funds available to the customer and the payment amount such that the customer lacks sufficient funds to complete the transaction. The system, in some embodiments, first determines an available amount of funds as discussed above. As represented by block 220, the next sub-step is determining a total credit maximum associated with the customer. The system accesses information associated with one or more credit accounts owned by the customer in order to determine a total credit maximum of the customer. In some embodiments, the system accesses only credit accounts maintained by a single financial institution, but in other embodiments, the system accesses credit accounts maintained by other financial institutions in order to determine a comprehensive total credit maximum. In other embodiments, as discussed above, the customer may input preferences regarding a virtual credit maximum associated with one or more credit accounts owned by the customer to be used in determining the total credit maximum. In this way, the customer may artificially maximum the amount of credit the system considers in determining the funds shortfall and thereby, the customer may limit the amount of credit the customer is using. In some embodiments, the total credit maximum is the credit maximum associated with a single credit account, such as a credit account having a corresponding transaction device, such as a credit card.

As used herein, a "bank account" refers to a credit account, a debit/deposit account, or the like. Although the phrase "bank account" includes the term "bank," the account need not be maintained by a bank and may, instead, be maintained by other financial institutions. As used herein, unless specifically limited by the context, a "transaction" may refer to a purchase of goods or services, a return of goods or services, a payment transaction, a credit transaction, or other transaction involving the consumer's bank account. As used herein, the term "products" refers to both goods and services.

A "transaction device" as used herein refers to any device used by the consumer to transfer or point to information useful to the vendor during a transaction proximate a point of sale. The term is intended to be read broadly to include many different types of devices such as loyalty devices, mobile devices, payment devices, and any other devices carried by a consumer during a transaction proximate a point of sale. When used herein, the term "payment device" is used synonymously with "transaction device" and is intended to include not only payment devices but also any other type of transaction devices as defined above. Examples of transaction or payment devices as used herein include, but are not limited to, loyalty devices such as loyalty cards or other loyalty devices, magnetic-based payment devices such as credit cards, debit cards, and the like, personal identification number (PIN) payment devices, contactless payment devices such as key fobs, radio frequency identification devices (RFID) and the like, and mobile devices such as smartphones, cellular phones, personal digital assistant (PDA) devices, MP3 devices, personal GPS devices and the like.

As represented by block 230, the next sub-step is determining an available positive balance. In this sub-step, the system accesses one or more of the DDAs or other accounts owned by the customer. In some embodiments, the system accesses only DDAs owned by the customer and maintained by the financial institution, and in other embodiments, the system accesses DDAs owned by the customer and maintained by one or more other financial institutions. In this regard, the system may be able to achieve an accurate picture of the total funds available for use in performing the transaction. In some embodiments, the system only accesses a DDA associated with the specific transaction device being used at the point of sale of the merchant to conduct the transaction for the customer. In some embodiments, the system only accesses the various accounts owned by the customer and maintained by the financial institution maintaining the account associated with the transaction device being used by the customer at the point of sale. For example, in one embodiment, the customer is using a transaction device at a point of sale of a merchant. The transaction device is associated with a DDA such that the transaction device may be used as a payment device at the point of sale. The system determines an available positive balance of the DDA associated with the transaction device.

As represented by block 240, the next sub-step is determining an available funds amount based at least in part on the total credit maximum and the available positive balance. In some embodiments, the available funds amount is based only on an available positive balance of one account, in other embodiments, the available funds amount is based only on a credit maximum of one account, and in other embodiments, the available funds amount is based on a combination of one or more positive balances associated with one or more accounts and one or more credit maximums associated with one or more accounts.

As represented by block 250, the next sub-step is determining the funds shortfall by comparing the payment amount with the available funds amount. The funds shortfall is determined, in some embodiments, by comparing the payment amount with the available funds amount. In some embodiments, for example, the system calculates the funds shortfall by subtracting the available funds amount from the payment amount. In the event the payment amount is less than the available funds amount, in some embodiments, the system does not institute steps 120-150.

In other embodiments, when the payment amount is less than the available funds amount, the system may apply an offset amount such that the available funds amount is less than the payment amount. This type of arrangement may be implemented in order to ensure the customer maintains a minimum balance in one or more DDAs or other accounts being accessed during the method 100. The offset amount, in various embodiments, may be predetermined by the financial institution or the customer or may be determined on a transaction-by-transaction basis. For example, for some transactions, the offset amount may be determined based on the purchase price of the transaction. In some embodiments, the offset amount is determined based on a frequency of use of the particular accounts being accessed by the method 100. For example, in some embodiments, the accounts being accessed have an average transaction amount of $200.00 and the customer averages one transaction per day. In such instances, it may be prudent for the customer to maintain some multiple of the average transaction amount for the accounts being accessed. In such situations, the offset amount is calculated based on these assumptions.

In various other embodiments, the offset amount may be determined based on a variety of other factors such as, for example, the frequency with which the customer makes purchases in a particular range of values. For example, if the customer has never made a purchase of the amount being requested, then the system may determine that maintaining a balance amount over than transaction amount may not be necessary, and therefore, may not generate an offset to accommodate such a high balance. Rather, the system may determine an offset amount based instead on some multiple of the average of the non-outlier transaction amounts associated with the customer's account. In some embodiments implementing an offset amount, regardless of whether the payment amount is less than the available funds amount, the system may still access the funds sharing network, identify users and request funds based because the offset amount in combination with the payment amount is greater than the available funds amount.

Referring now to FIG. 3, a flowchart illustrates details regarding method step 120 originally presented in FIG. 1 according to embodiments of the invention. Step 120 is accessing a funds sharing network comprising a plurality of users. As represented by block 310, the first sub-step is accessing a social network of the customer. The social network of the customer may be or include some or all of a pre-existing social network of the customer in some embodiments. In other embodiments, accessing the social network of the customer includes accessing a funds sharing network established primarily for the purpose of sharing funds among users. In some embodiments, the funds sharing network is part of a pre-existing social network. For example, in some embodiments, the funds sharing network is a group of users of a pre-existing social network.

As represented by block 320, the next sub-step is accessing a network of users socially unassociated with the user, the network of users associated with the user solely for purposes of sharing funds. This sub-step, in some embodiments, is performed in place of sub-step 310 and refers to accessing a social network or funds sharing network established and/or configured such that the users are unassociated beforehand. In some embodiments, the users share some common interest or habit, such as shopping frequently at a particular type of store, such as at a sporting goods store. In such a funds sharing network, some users who frequent sporting goods stores may be more apt to contribute funds to a sharing account for others sharing similar interests.

Referring now to FIG. 4, a flowchart illustrates details regarding method step 130 originally presented in FIG. 1 according to embodiments of the invention. Step 130 is identifying one or more of the users of the funds sharing network. As represented by block 410, the first sub-step is determining whether one or more of the users of the funds sharing network are indebted to the customer. The system may access information input by the users of the funds sharing network, for example, during or after every transaction, one or more users may input information regarding indebtedness. In other embodiments, however, the system maintains a database storing data indicating the indebtedness of each user with every other user in the funds sharing network. In some embodiments, when a funds sharing network is established, when the funds sharing network is updated, which may occur periodically, or when one or more users manually make a request, the database of indebtedness is updated by receiving input from one or more users. In some embodiments, when one or more users is inputting indebtedness information, the system may require authentication and/or approval from one or more of the users, such as the one or more users against whom the indebtedness is being recorded. In other embodiments, such as when a merchant or other user, such as a user having a confirmed identity, inputs indebtedness information, the system does not require further confirmation of the indebtedness from the user against whom the indebtedness is being recorded.

According to some embodiments of the invention, for example, a customer may become indebted to one or more others during an offline transaction. An offline transaction, may refer, for example, to a transaction involving the customer and one or more users for which the customer is not in communication with the system concurrently during or proximal in time to the transaction. For example, the customer dines with two friends at a restaurant and pays for the friends' meals. Thus, the customer has become indebted to the friends. In such instances, embodiments of the social network payment settlement system receive customer and/or other users' input regarding indebtedness. In some instances, as discussed above, the customer may input information to the system indicating the customer's indebtedness, and in other instances, one or more of the users may input the information to the system with or without additional confirmation of the indebtedness.

In various embodiments of the invention, the system provides for debt forgiveness. Further to the example illustrated above regarding offline transactions, in some instances, the customer may decide to forgive the lunch debt. For example, the friends may input the indebtedness manually into the system, and the customer may be notified of the indebtedness indicated by the friends. The system, in some embodiments, then presents an option to the customer to maintain the debt or forgive the debt. In various other embodiments, the customer may proactively forgive a debt associated with one or more users, regardless of whether the debt was incurred via an offline transaction. For example, in some instances, one or more users are indebted to the customer, and the customer is aware of such indebtedness based on communications from a customer interface or other communication provided by the system. In such instances, the customer may choose to forgive one or more of the debts. The customer may select a debt to forgive from a listing of debts owed to the customer from the customer interface provided by the system and select an option to forgive the debt. In various embodiments, the system then communicates the debt forgiveness to the user or users to whom the customer has forgiven the debt.

As represented by block 420, the next sub-step is determining that two or more of the users of the funds sharing network are indebted to the customer. In this sub-step, the system accesses the database of indebtedness and determines that more than one user is indebted to the customer attempting a transaction using the social network payment system.

As represented by block 430, the next sub-step is comparing the indebtedness of the two or more users to develop a hierarchy of indebtedness. The system, in some embodiments, creates a hierarchy of indebtedness. This hierarchy may be or include a spreadsheet incorporating the various users indebted to the customer and their relative indebtedness. In this way, the system may create a tool useful in comparing the indebtedness of the various users. In other embodiments, the system does not create a hierarchy of indebtedness, but rather, merely compares each of the users' indebtedness to determine which of the one or more users has the highest indebtedness to the customer.

As represented by block 440, the next sub-step is choosing one or more of the two or more users based at least in part on the hierarchy of indebtedness. In this step, the system may choose the one or more users having the highest indebtedness to the customer. As mentioned above, in various embodiments of the invention, the system does not create a hierarchy, but rather compares the indebtedness of the two or more users and thereby determines the one or more users having the highest indebtedness. In various other embodiments, the system chooses one or more users based on their indebtedness being lower than the remaining indebted user(s).

Referring now to FIG. 5, a flowchart illustrates alternative details regarding method step 130 originally presented in FIG. 1 according to embodiments of the invention. As discussed above, step 130 is identifying one or more of the users of the funds sharing network. As represented by block 510, the first sub-step is determining levels of connection between two or more of the users and the customer. In this step, the system determines which users are closest to the customer. Closeness may be determined based on familial, working or friendship relationships, degrees of separation in a social network, amount of interaction between each specific user and the customer, amount of similar Internet activity, such as visiting the same and/or similar websites, and the like.

As represented by block 520, the next sub-step is comparing the levels of connection in order to develop a hierarchy of connection. In some embodiments, no hierarchy is created, but rather, the system compares the two or more determined levels of connection. As represented by block 530, the next sub-step is choosing one or more of the two or more users based at least in part on the hierarchy of connection. In some embodiments, as discussed above, the system does not use the hierarchy, but rather, compares the two or more levels of connection and chooses one or more users based on the comparison of levels. In some embodiments, some combination of the hierarchy of indebtedness and the hierarchy of connection are used by the system to choose one or more users. For example, in one embodiment, all users having an indebtedness of a certain amount or indebtedness surpassing or falling below a particular threshold are excluded from further consideration. Then, the remaining users are compared based on the hierarchy of connection to determine which user has the highest level of connection with the customer. In this example, the chosen user is then either sent a request for funds or funds are automatically transferred from one or more accounts associated with and/or owned by the chosen user.

In some embodiments, one or both the hierarchy of indebtedness and the hierarchy of connection are made available to the customer and/or an administrator of the funds sharing network and/or the social network settlement system.

Referring now to FIG. 6, a flowchart illustrates details regarding method steps 140 and 150 originally presented in FIG. 1 according to embodiments of the invention. Step 140 is requesting funds from the identified one or more users. As represented by block 610, the first sub-step is sending a communication to the one or more users requesting some or all the funds shortfall. In some embodiments, the request is a message sent to the customer or some device possessed by the customer. The message may include a request for approval for the funds transfer for some or all the funds shortfall. In other embodiments, the request is a request for a funds transfer to the banking server or other managing system controlling access to one or more accounts associated with and/or owned by the user. As represented by block 620, the next sub-step is accessing an account owned by one of the identified users. This may be in response to an approval communicated by the user in some embodiments, and may be automatic in other embodiments. The next step, as represented by block 150, is applying funds received from the one or more users to the funds shortfall. As represented by block 630, a sub-step is transferring some or all the funds shortfall from the accessed account or accounts to the merchant.

Referring now to FIG. 7, a flowchart illustrates alternate details regarding method steps 140 and 150 originally presented in FIG. 1 according to embodiments of the invention. As discussed above, step 140 is requesting funds from the identified one or more users. As represented by block 710, a sub-step is accessing an account or accounts owned by one of the identified users. Step 150 is applying funds received from the one or more users to the funds shortfall. The first sub-step, as represented by block 720, is transferring an amount equal to some or all the funds shortfall from the accessed account or accounts to the customer. The next sub-step, as represented by block 730, is transferring an amount equal to some or all the funds transferred from the one or more users to the customer in sub-step 720 to the merchant. For example, in one embodiment, funds are transferred from a funds sharing account to a customer account, such as, for example, the DDA associated with the customer's transaction device. Then, the funds provided to the merchant in the regular course of performing the transaction with the customer using the transaction device. In various other embodiments, the funds are transferred to a customer's credit account and then applied to the transaction using the customer's credit card at the point of sale. In this regard, and in the event the customer's account is an affinity and/or rewards account, the customer may be able to gain the added benefit of accumulating points, rewards or some other benefit by using the funds sharing network.

Referring now to FIG. 8, a flowchart illustrates a method 800 including various steps that may be included with one or more steps from one or more of the other methods discussed herein. The steps discussed with reference to FIG. 8 may or may not be used in conjunction with one another in various embodiments, and in fact, may be used without any of the other steps shown in FIG. 8. The first step, as represented by block 810, is collecting a transaction fee from the customer for managing completion of the transaction. For example, in some embodiments, collecting the transaction fee includes transferring additional funds from one or more of the users of the funds sharing network. In various other embodiments, collecting the transaction fee also includes applying the additional funds to the transaction fee. The next step, as represented by block 820, is collecting a participation fee from the customer and each of the users of the funds sharing network for access to the funds sharing network and for potentially managing completion of the one or more transactions having funds shortfalls.

The next step, as represented by block 830, is tracking a customer indebtedness of the customer to the one or more identified users based at least in part on the amount of funds received form the one or more users and applied to the funds shortfall. In this step, the system automatically stores the indebtedness of the one or more users to the customer in the database of indebtedness.

The next step, as represented by block 840, is communicating a message to the customer. In various embodiments, the message includes a reminder of the customer indebtedness to the one or more identified users. The next step, as represented by block 850, is applying an interest amount to the customer indebtedness based on a period of elapsed time of the customer indebtedness. In this way, the system provides an incentive for the customer to repay the debt. The final step, as represented by block 860, is communicating one or more messages to at least one of the users of the funds sharing network. The one or more messages, in various embodiments, include information related to the customer indebtedness. In this regard, the system is configured to motivate the customer to repay the customer debt.

In various embodiments of the invention, the system maintains information regarding indebtedness among various users of the system such that a debt owed by party A to party B may be combined with a debt owed by party B to party C such that party A owes party C rather than owing party B. For example, if party A owes party B $100.00 and party B owes party C $100.00, then the system may be configured to forgive party A's debt to party B by transferring $100.00 from party A to party C, thereby making party C whole. In various other more complicated instances, portions of debt may be forgiven in exchange for paying a third party indebtedness and/or request for purchase and/or request for borrowing funds. In some embodiments the users of the funds sharing network may specify preferences regarding debt payment and/or debt forgiveness. For example, in some embodiments, a user of the funds sharing network may specify that any debts owed to the user by a second party may be paid by a third party in order to forgive the second party's debt. In this example, the third party may proactively offer to repay the second party debt out of charity or some other motivations, or in other embodiments, the third party may be indebted to the second party. In those embodiments, the third party may repay some or all the debt to the second party by paying the user. This debt sharing scenario may provide an efficient means by which debts across multiple users may be settled. This may be because the system is aware of numerous debts owed among a variety of users, and no single user would be aware of the numerous number of debts. In instances where the applicable users have input preferences providing for payment of debts and forgiveness of indebtedness, debts may be forgiven in an automated fashion. In some embodiments, the system confirms the debt payment to a third party or user not directed involved in an indebted relationship with a customer before completing such third party debt repayments or transactions.

Referring now to FIG. 9, an environment 900 in which a social network payment settlement system 901 operates is illustrated. The social network payment settlement system 901 may, in various embodiments be configured for performing one or more of the steps of one or more of the steps and/or sub-steps discussed with reference to FIGS. 1-8 and/or one or more additional steps and/or sub-steps. In the configuration shown, the social network payment settlement system 901 communicates across a network 920 with one or more remote devices, such as workstation 940, workstation 930, laptop 950 and/or handheld device 960. This configuration is intended to illustrate that a customer or other user (not shown) can interact with the social network payment settlement system 901 using a variety of devices remote to the social network payment settlement system 901. Furthermore, in some embodiments one or more customers can interact with the social network payment settlement system 901 locally such as through an input/output device attached directly with the social network payment settlement system 901.

The social network payment settlement system 901 may communicate across the network with one or more other systems or servers, such as one or more financial institution servers, such as server 903. In some embodiments, server 903 illustrates more than one server or network of servers and is intended to represent a payment network through which electronic funds transfer payments are transacted. In some embodiments, the customer is carrying a transaction device, such as mobile device 960 or some other transaction device when the customer arrives at a point of sale of a merchant intending to purchase a product. In this example, the customer uses the transaction device to initiate payment for the product and the point of sale communicates across the network 920, such as through a payment network as represented by server 903. The transaction is routed to the social network payment settlement system 901, which is configured for performing some or all the various steps disclosed herein, such as determining a funds shortfall for the transaction (see step 110). Once the methods are complete, which may constitute applying funds from the one or more identified user to the funds shortfall, the customer completes the transaction using the transaction device (in some embodiments).

The customer awareness platform system 901, in various embodiments, has a communication device 902 controlled by a processing device 904 in order to communicate across the network 920. The network 920 is an intranet, the Internet, a local area network, a wide area network, and/or any other electronic device network, and/or any combination of the same. The processing device 904 is also in communication with a memory device 906 configured for storing computer-readable and computer-executable instructions 908. The computer-readable instructions, in various embodiments, include one or more applications, such as a social network payment settlement application 910.

Generally, in some embodiments, some, all or none of the method steps and/or sub-steps discussed above with reference to FIGS. 1, 2, 3, 4, 5, 6, 7 and/or 8 are embodied in computer-executable instructions within the social network payment settlement application 910. In some embodiments, one or more applications are contained within a single social network payment settlement application 910, and in other embodiments, the instructions for executing the method steps disclosed herein are spread over two or more applications. In some embodiments, some of the instructions for executing the methods disclosed herein are stored on the social network payment settlement system 901 and some of the instructions are stored on a customer device, such as a transaction device. In some embodiments, some or all the instructions are stored remotely from the social network payment settlement system 901 and accessed as necessary by the social network payment settlement system 901 and/or any other device requiring instructions. Further, in some embodiments, the memory device 906 includes a datastore 916 or database configured for storing information and/or data such as the data corresponding to indebtedness of the various users with respect to one another and/or the customer. In other embodiments, the datastore 916 is housed remotely from the social network payment settlement system 901 and the social network payment settlement system 901 is in communication with the datastore 916 across the network 920 and/or across some other communication link.

In some embodiments one or more additional systems or servers are configured for communicating with the social network payment settlement system 901. In some such embodiments, information regarding different customers and/or users, such as preferences regarding a funds sharing network may be stored in various locations on different systems. In some embodiments, information regarding one customer's financial accounts, social networks, funds sharing networks and the like may be stored on separate systems or datastores. In some embodiments, a social network payment settlement system 901 functions as a central control server and accesses the various pieces of customer information from various locations. In various other embodiments, multiple servers or systems functions together as a central control server and access different pieces of data and/or instructions in order to perform one or more of the method steps discussed herein.

In summary, embodiments of the invention provide a method for effecting transfer of a payment amount to a merchant during a transaction between a customer and the merchant includes determining, using a processing device, a funds shortfall, accessing a funds sharing network comprising a plurality of users, identifying one or more of the users of the funds sharing network, requesting funds from the identified one or more users, and applying funds received from the one or more users to the funds shortfall. In some embodiments, identifying one or more of the users includes determining whether one or more of the users are indebted to the customer, determining levels of connection between two or more of the users and the customer, and developing a hierarchy of users based on the indebted users and the levels of connection.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for effecting transfer of a payment amount to a merchant during a transaction between a customer and the merchant, the method comprising:
using a computer processor operating computer program code instructions stored in a non-transitory computer readable medium, wherein said computer program code instructions cause said computer processor to:
determine a funds shortfall;
access a funds sharing network comprising a plurality of users;
identify one or more of the users of the funds sharing network;
request funds from the identified one or more users;
apply funds received from the one or more users to the funds shortfall
wherein the one or more users identified from the funds sharing network are not indebted to the customer, and wherein said computer processor is further to:
track a customer indebtedness of the customer to the one or more identified users based at least in part on the amount of funds received from the one or more users and applied to the funds shortfall;
apply an interest amount to the customer indebtedness based on a period of elapsed time of the customer indebtedness; and
communicate one or more messages to at least one of the users of the funds sharing network, the one or more messages comprising information related to the customer indebtedness, thereby motivating the customer to repay the customer indebtedness.

2. The method of claim 1, wherein determining a funds shortfall comprises determining a difference between funds available to the customer and the payment amount such that the customer lacks sufficient funds to complete the transaction.

3. The method of claim 1, wherein determining a funds shortfall comprises:
   determining a total credit limit associated with the customer;
   determining an available positive balance;
   determining an available funds amount based at least in part on the total credit limit and the available positive balance; and
   determining the funds shortfall by comparing the payment amount with the available funds amount.

4. The method of claim 1, wherein accessing a funds sharing network comprising a plurality of users comprises accessing a social network of the customer.

5. The method of claim 1, wherein identifying one or more of the users of the funds sharing network comprises determining whether one or more of the users of the funds sharing network are indebted to the customer.

6. The method of claim 5, wherein identifying one or more of the users of the funds sharing network comprises:
   determining that two or more of the users of the funds sharing network are indebted to the customer;
   comparing the indebtedness of the two or more users to develop a hierarchy of indebtedness; and
   choosing one or more of the two or more users based at least in part on the hierarchy of indebtedness.

7. The method of claim 1, wherein identifying one or more of the users of the funds sharing network comprises:
   determining levels of connection between two or more of the users and the customer;
   comparing the levels of connection in order to develop a hierarchy of connection; and
   choosing one or more of the two or more users based at least in part on the hierarchy of connection.

8. The method of claim 1, wherein accessing a funds sharing network comprising a plurality of users comprises accessing a network of users socially unassociated with the user, the network of users associated with the user solely for purposes of sharing funds.

9. The method of claim 1, wherein requesting funds from the identified one or more users comprises sending a communication to the one or more users requesting some or all the funds shortfall.

10. The method of claim 1, wherein requesting funds from the identified one or more users comprises accessing an account owned by one of the identified users and wherein applying funds received from the one or more users to the funds shortfall comprises transferring some or all the funds shortfall from the accessed account to the merchant.

11. The method of claim 1, wherein requesting funds from the identified one or more users comprises accessing an account owned by one of the identified users and wherein applying funds received from the one or more users to the funds shortfall comprises transferring an amount equal to some or all the funds shortfall from the accessed account to the customer and transferring an amount equal to some or all the funds transferred from the one or more users to the customer to the merchant.

12. The method of claim 1, further comprising:
   collecting a transaction fee from the customer for managing completion of the transaction.

13. The method of claim 12, wherein collecting the transaction fee comprises transferring additional funds from one or more of the users of the funds sharing network and applying the additional funds to the transaction fee.

14. The method of claim 1, further comprising:
   collecting a participation fee from the customer and each of the users of the funds sharing network for access to the funds sharing network and for potentially managing completion of one or more transactions having funds shortfalls.

15. The method of claim 1, further comprising:
   receiving a participation amount from the customer and each of the users of the funds sharing network as contributions to one or more funds sharing accounts.

16. The method of claim 1, further comprising:
   communicating a message to the customer, the message comprising a reminder of the customer indebtedness to the one or more identified users.

17. A system for effecting transfer of a payment amount to a merchant during a transaction between a customer and the merchant, the system comprising a processing device configured for:
   determining a funds shortfall;
   accessing a funds sharing network comprising a plurality of users;
   identifying one or more of the users of the funds sharing network;
   requesting funds from the identified one or more users;
   applying funds received from the one or more users to the funds shortfall;
   wherein the one or more users identified from the funds sharing network are not indebted to the customer, and wherein the processing device is further configured for:
   tracking a customer indebtedness of the customer to the one or more identified users based at least in part on the amount of funds received from the one or more users and applied to the funds shortfall;
   applying an interest amount to the customer indebtedness based on a period of elapsed time of the customer indebtedness; and
   communicating one or more messages to at least one of the users of the funds sharing network, the one or more messages comprising information related to the customer indebtedness, thereby motivating the customer to repay the customer indebtedness.

18. The system of claim 17, wherein determining a funds shortfall comprises determining a difference between funds available to the customer and the payment amount such that the customer lacks sufficient funds to complete the transaction.

19. The system of claim 17, wherein determining a funds shortfall comprises:
   determining a total credit limit associated with the customer;
   determining an available positive balance;
   determining an available funds amount based at least in part on the total credit limit and the available positive balance; and
   determining the funds shortfall by comparing the payment amount with the available funds amount.

20. The system of claim 17, wherein accessing a funds sharing network comprising a plurality of users comprises accessing a social network of the customer.

21. The system of claim 17, wherein identifying one or more of the users of the funds sharing network comprises determining whether one or more of the users of the funds sharing network are indebted to the customer.

22. The system of claim 21, wherein identifying one or more of the users of the funds sharing network comprises:
   determining that two or more of the users of the funds sharing network are indebted to the customer;
   comparing the indebtedness of the two or more users to develop a hierarchy of indebtedness; and choosing one or more of the two or more users based at least in part on the hierarchy of indebtedness.

23. The system of claim 17, wherein identifying one or more of the users of the funds sharing network comprises:
   determining levels of connection between two or more of the users and the customer;
   comparing the levels of connection in order to develop a hierarchy of connection; and
   choosing one or more of the two or more users based at least in part on the hierarchy of connection.

24. The system of claim 17, wherein accessing a funds sharing network comprising a plurality of users comprises accessing a network of users socially unassociated with the user, the network of users associated with the user solely for purposes of sharing funds.

25. The system of claim 17, wherein requesting funds from the identified one or more users comprises sending a communication to the one or more users requesting some or all the funds shortfall.

26. The system of claim 17, wherein requesting funds from the identified one or more users comprises accessing an account owned by one of the identified users and wherein applying funds received from the one or more users to the funds shortfall comprises transferring some or all the funds shortfall from the accessed account to the merchant.

27. The system of claim 17, wherein requesting funds from the identified one or more users comprises accessing an account owned by one of the identified users and wherein applying funds received from the one or more users to the funds shortfall comprises transferring an amount equal to some or all the funds shortfall from the accessed account to the customer and transferring an amount equal to some or all the funds transferred from the one or more users to the customer to the merchant.

28. The system of claim 17, wherein the processing device is further configured for:
   collecting a transaction fee from the customer for managing completion of the transaction.

29. The system of claim 28, wherein collecting the transaction fee comprises transferring additional funds from one or more of the users of the funds sharing network and applying the additional funds to the transaction fee.

30. The system of claim 17, wherein the processing device is further configured for:
   collecting a participation fee from the customer and each of the users of the funds sharing network for access to the funds sharing network and for potentially managing completion of one or more transactions having funds shortfalls.

31. The system of claim 17, wherein the processing device is further configured for:
   receiving a participation amount from the customer and each of the users of the funds sharing network as contributions to one or more funds sharing accounts.

32. The system of claim 17, wherein the processing device is further configured for:
   communicating a message to the customer, the message comprising a reminder of the customer indebtedness to the one or more identified users.

33. A computer program product comprising a non-transient computer-readable medium comprising computer-executable instructions for effecting transfer of a payment amount to a merchant during a transaction between a customer and the merchant, the instructions comprising:
   instructions for determining a funds shortfall;
   instructions for accessing a funds sharing network comprising a plurality of users;
   instructions for identifying one or more of the users of the funds sharing network;
   instructions for requesting funds from the identified one or more users;
   instructions for applying funds received from the one or more users to the funds shortfall
   wherein the one or more users identified from the funds sharing network are not indebted to the customer, and wherein the instructions further comprise:
   instructions for tracking a customer indebtedness of the customer to the one or more identified users based at least in part on the amount of funds received from the one or more users and applied to the funds shortfall;
   instructions for applying an interest amount to the customer indebtedness based on a period of elapsed time of the customer indebtedness; and
   instructions for communicating one or more messages to at least one of the users of the funds sharing network, the one or more messages comprising information related to the customer indebtedness, thereby motivating the customer to repay the customer indebtedness.

34. The computer program product of claim 33, wherein the instructions for determining a funds shortfall comprise instructions for determining a difference between funds available to the customer and the payment amount such that the customer lacks sufficient funds to complete the transaction.

35. The computer program product of claim 33, wherein the instructions for determining a funds shortfall comprise:
   instructions for determining a total credit limit associated with the customer;
   instructions for determining an available positive balance;
   instructions for determining an available funds amount based at least in part on the total credit limit and the available positive balance; and
   instructions for determining the funds shortfall by comparing the payment amount with the available funds amount.

36. The computer program product of claim 33, wherein the instructions for accessing a funds sharing network comprising a plurality of users comprise instructions for accessing a social network of the customer.

37. The computer program product of claim 33, wherein the instructions for identifying one or more of the users of the funds sharing network comprise instructions for determining whether one or more of the users of the funds sharing network are indebted to the customer.

38. The computer program product of claim 37, wherein the instructions for identifying one or more of the users of the funds sharing network comprise:
   instructions for determining that two or more of the users of the funds sharing network are indebted to the customer;
   instructions for comparing the indebtedness of the two or more users to develop a hierarchy of indebtedness; and
   instructions for choosing one or more of the two or more users based at least in part on the hierarchy of indebtedness.

39. The computer program product of claim 33, wherein the instructions for identifying one or more of the users of the funds sharing network comprise:
   instructions for determining levels of connection between two or more of the users and the customer;
   instructions for comparing the levels of connection in order to develop a hierarchy of connection; and
   instructions for choosing one or more of the two or more users based at least in part on the hierarchy of connection.

40. The computer program product of claim 33, wherein the instructions for accessing a funds sharing network comprising a plurality of users comprise instructions for accessing a network of users socially unassociated with the user, the network of users associated with the user solely for purposes of sharing funds.

41. The computer program product of claim 33, wherein the instructions for requesting funds from the identified one or more users comprise instructions for sending a communication to the one or more users requesting some or all the funds shortfall.

42. The computer program product of claim 33, wherein the instructions for requesting funds from the identified one or more users comprise instructions for accessing an account owned by one of the identified users and wherein the instructions for applying funds received from the one or more users to the funds shortfall comprise instructions for transferring some or all the funds shortfall from the accessed account to the merchant.

43. The computer program product of claim 33, wherein the instructions for requesting funds from the identified one or more users comprise instructions for accessing an account owned by one of the identified users and wherein the instructions for applying funds received from the one or more users to the funds shortfall comprise instructions for transferring an amount equal to some or all the funds shortfall from the accessed account to the customer and transferring an amount equal to some or all the funds transferred from the one or more users to the customer to the merchant.

44. The computer program product of claim 33, wherein the instructions further comprise:
    instructions for collecting a transaction fee from the customer for managing completion of the transaction.

45. The computer program product of claim 44, wherein the instructions for collecting the transaction fee comprise instructions for transferring additional funds from one or more of the users of the funds sharing network and instructions for applying the additional funds to the transaction fee.

46. The computer program product of claim 33, wherein the instructions further comprise:
    instructions for collecting a participation fee from the customer and each of the users of the funds sharing network for access to the funds sharing network and for potentially managing completion of one or more transactions having funds shortfalls.

47. The computer program product of claim 33, wherein the instructions further comprise:
    instructions for receiving a participation amount from the customer and each of the users of the funds sharing network as contributions to one or more funds sharing accounts.

48. The computer program product of claim 33, wherein the instructions further comprise:
    instructions for communicating a message to the customer, the message comprising a reminder of the customer indebtedness to the one or more identified users.

49. A computer-implemented method for effecting transfer of a payment amount to a merchant during a transaction between a customer and the merchant, the method comprising:
    using a computer processor operating computer program code instructions stored in a non-transitory computer readable medium, wherein said computer program code instructions cause said computer processor to:
        determine a difference between funds available to the customer and the payment amount such that the customer lacks sufficient funds to complete the transaction, thereby resulting in a funds shortfall;
        access a funds sharing network comprising a plurality of users;
        identify one or more of the users of the funds sharing network comprising:
            determining whether one or more of the users of the funds sharing network are indebted to the customer;
            determining levels of connection between two or more of the users and the customer; and
            developing a hierarchy of users based at least in part on whether one or more of the users of the funds sharing network are indebted to the customer and based at least in part on the levels of connection between two or more of the users and the customer;
        request funds from the identified one or more users;
        apply funds received from the one or more users to the funds shortfall;
        request funds from at least other of the one or more users identified from the funds sharing network and that are not indebted to the customer;
        track a customer indebtedness of the customer to the one or more identified users based at least in part on the amount of funds received from the one or more users and applied to the funds shortfall;
        apply an interest amount to the customer indebtedness based on a period of elapsed time of the customer indebtedness; and
        communicate one or more messages to at least one of the users of the funds sharing network, the one or more messages comprising information related to the customer indebtedness, thereby motivating the customer to repay the customer indebtedness.

50. The method of claim 49, wherein determining a funds shortfall comprises:
    determining a total credit limit associated with the customer;
    determining an available positive balance;
    determining an available funds amount based at least in part on the total credit limit and the available positive balance; and
    determining the funds shortfall by comparing the payment amount with the available funds amount.

51. The method of claim 49, wherein identifying one or more of the users of the funds sharing network further comprises:
    determining that two or more of the users of the funds sharing network are indebted to the customer;
    comparing the indebtedness of the two or more users to develop a hierarchy of indebtedness; and
    choosing one or more of the two or more users based at least in part on the hierarchy of indebtedness.

52. The method of claim 49, wherein identifying one or more of the users of the funds sharing network further comprises:
    comparing the levels of connection in order to develop a hierarchy of connection; and
    choosing one or more of the two or more users based at least in part on the hierarchy of connection.

53. The method of claim 49, wherein identifying one or more of the users of the funds sharing network further comprises:
    determining that none of the users of the funds sharing network are indebted to the customer;
    comparing the levels of connection in order to develop a hierarchy of connection; and
    choosing one or more of the two or more users based at least in part on the hierarchy of connection.

* * * * *